UNITED STATES PATENT OFFICE 2,032,844

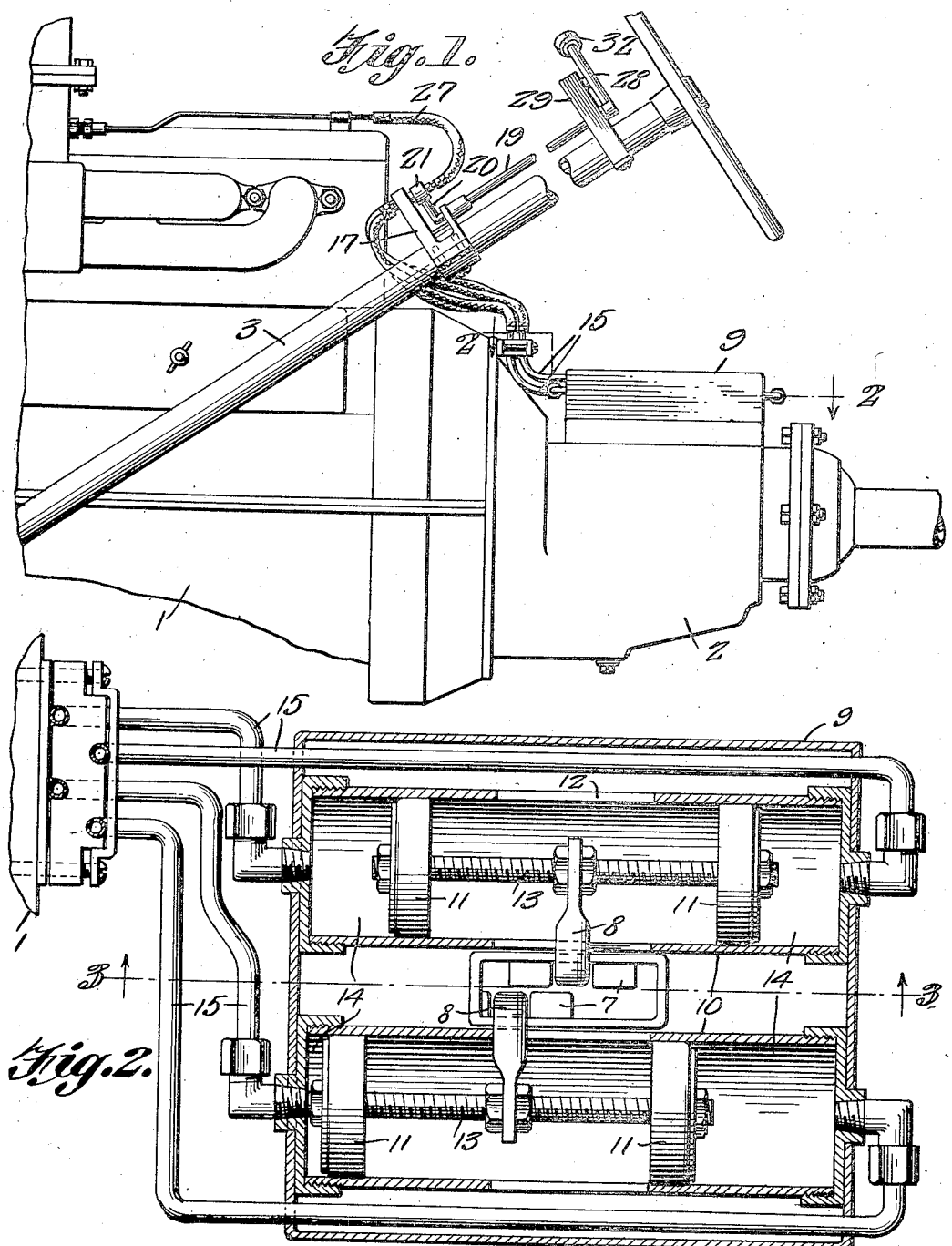

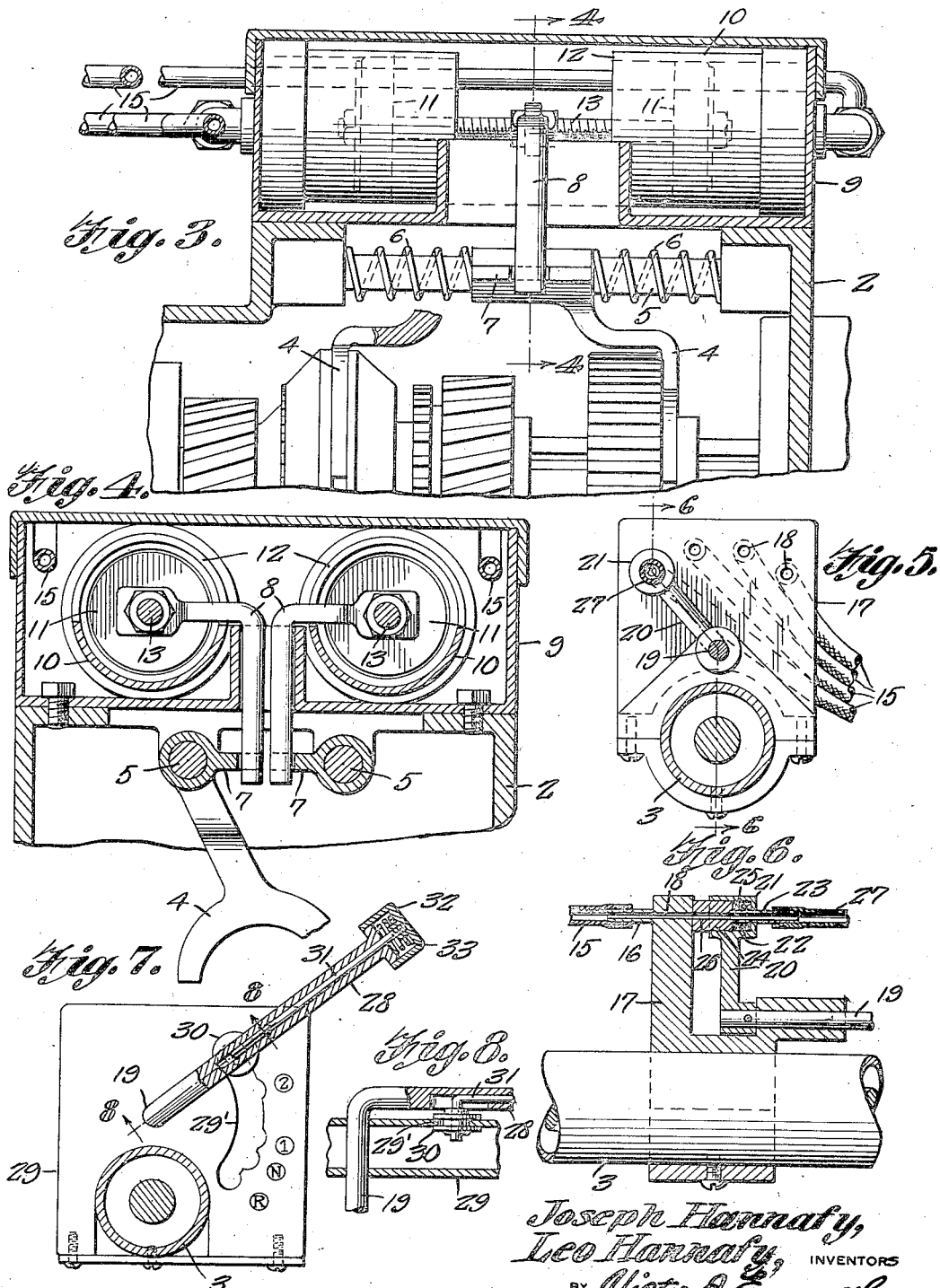

VACUUM GEAR SHIFTING DEVICE

Joseph Hannafy and Leo Hannafy, Philadelphia, Pa., assignors of one-third to Francis P. Bigley, Philadelphia, Pa.

Application June 4, 1935, Serial No. 24,976

1 Claim. (Cl. 74—346)

This invention relates to vacuum operated selected transmission adaptable to motor vehicles and other similar devices and has for the primary object the provision of a device of this character which is under manual control whereby the speed changing gears of a selected transmission may be caused to change positions for providing different speeds forward and reverse by vacuum developed by the engine of a vehicle or some other medium should it be desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation showing a motor vehicle engine and steering mechanism equipped with a vacuum operated selected transmission constructed in accordance with the present invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 3.

Figure 5 is a detail sectional view illustrating part of the control for the transmission.

Figure 6 is a sectional view taken on the line 6—6 of Figure 5.

Figure 7 is a plan view, partly in section, showing the operating lever for the control mounted to the steering mechanism of the motor vehicle.

Figure 8 is a sectional view taken on the line 8—8 of Figure 7.

Referring in detail to the drawings, the numeral 1 indicates an internal combustion engine employed in a motor vehicle having connected thereto in the usual way a selected gear transmission 2, the major portion of which is of the conventional construction shown in the drawings. To one side of the engine 1 is a steering post 3 of the motor vehicle and which provides a mounting for the control of our invention. The shifting forks of the transmission 2 are indicated by the character 4 and are shown as slidably mounted upon guide rods 5. The connection between the shifting forks 4 and the gears of the transmission is conventional. Mounted on the guide rods 5 are coil springs 6 acting on the shifting forks to position the shifting gears of the transmission in neutral or non-meshing position. Spaced lugs 7 are formed on the shifting forks and receive therebetween shifting arms 8 which extend outwardly of the housing.

A casing 9 is mounted on the housing 2 and supports pairs of cylinders 10. The cylinders of each pair are integrally connected and have operating therein pairs of pistons 11. The cylinders of each pair between the respective pairs of pistons 11 are opened to the atmosphere by ports 12. The pistons of each pair are connected by a stem 13. The stems 13 are adjustably connected to the shifting arms 8, the latter entering the cylinders by way of the ports 12. Between the pistons 11 and the closed ends of the cylinders are formed vacuum chambers 14 and connected to said chambers are pipes 15 and they are in turn connected to nipples 16 carried by a control base 17. The base 17 is suitably mounted on the steering column 3 and has formed therein a series of ports 18 communicative with the nipples 16. The ports 18 open outwardly through the top face of the base and are four in number.

A control rod 19 is journaled to the base 17 and one end thereof has secured thereto an arm 20 movable over the control base by the rotation of the control rod. The arm 20 terminates in a head 21 having a chamber 22 closed at one end. The closed end of the chamber 22 is apertured to slidably receive a tube 23 forming a part of a valve element 24. A coil spring 25 is located in the chamber 22 and acts upon the valve element 24 to urge the latter in tight engagement with the top face of the control base. A port 26 is provided in the valve element which communicates with the tube 23 and also during the movement of the arm 20 over the base 17 is adapted to communicate with the ports 18. A pipe 27 is connected to the tube 23 and to the intake manifold of the engine, as shown in Figure 1. The upper end of the control rod 19 has secured thereto an operating lever 28. The operating lever moves over a bracket 29 secured to the steering column 3. The bracket 29 has applied thereto numbers and characters indicating the position of the ports 18. On the bracket there are four positions one designating reverse of transmission, another for the neutral position of the transmission and others denoting first, second and third speeds of the transmission, as shown in Figure 7. The bracket 29 is of a hollow formation and has an arcuate-shaped slot 29', one wall of which is provided with notches arranged opposite to the position designating characters. Operating in the slot 29' is a grooved roller 30 carried by a rod 31 slidably mounted in the control lever 28. The rod 31 extends outwardly of the control lever and has secured thereto a cap or head 32 provided with slidable contact with the control lever. A coil spring 33 acts on the cap or head 32 to position the roller 30 against the notched wall of the slot 29′ and when said roller enters any one of the notches it retains the control lever against accidental movement.

The normal position of the control lever 28 is opposite the character N, placing the transmission in neutral position. The control lever 28 may be moved into any of the other positions denoted on the bracket for the purpose of placing the transmission either in reverse, first speed, second speed or third speed. The control lever 28 when in any of the latter-named positions, positions the valve element to align with a port 18 so that the vacuum developed in the intake manifold of the engine may operate in the vacuum chamber of the cylinder causing an endwise movement of the piston of said cylinder. The movement of the piston slides the proper gear of the transmission into mesh with another gear of said transmission so that the transmission will operate at the speed desired. As soon as any one of the ports 18 are uncovered by the valve element, the vacuum chamber connected to said port is placed in communication with the atmosphere so that the springs 6 may act to place the gear which was in variable speed producing positions in a neutral position.

Having described the invention, we claim:

A control for vacuum actuated transmissions comprising brackets each including a plate-like portion and one portion having openings therethrough and adapted to be connected to vacuum chambers of a vacuum actuated transmission and the other plate-like portion having an arcuately curved slot provided with notches in one wall thereof and the notches corresponding in number to the number of openings, a control rod extending through one of the brackets and rotatably supported thereby, an arm secured to the rod, a valve element carried by said arm and adapted for connection to a vacuum source and movable over the plate-like portion having the opening for closing and opening said opening to the vacuum source and to the atmosphere, an operating lever secured to the rod, a second rod slidably mounted to the operating lever, a roller journaled to said second rod and engaging walls of the slot to move into and out of the notches, and spring means acting to urge the roller towards the notches.

JOSEPH HANNAFY.
LEO HANNAFY.